June 16, 1953  J. D. MORRISON  2,641,836
DENTAL PLUGGER
Filed Aug. 31, 1951
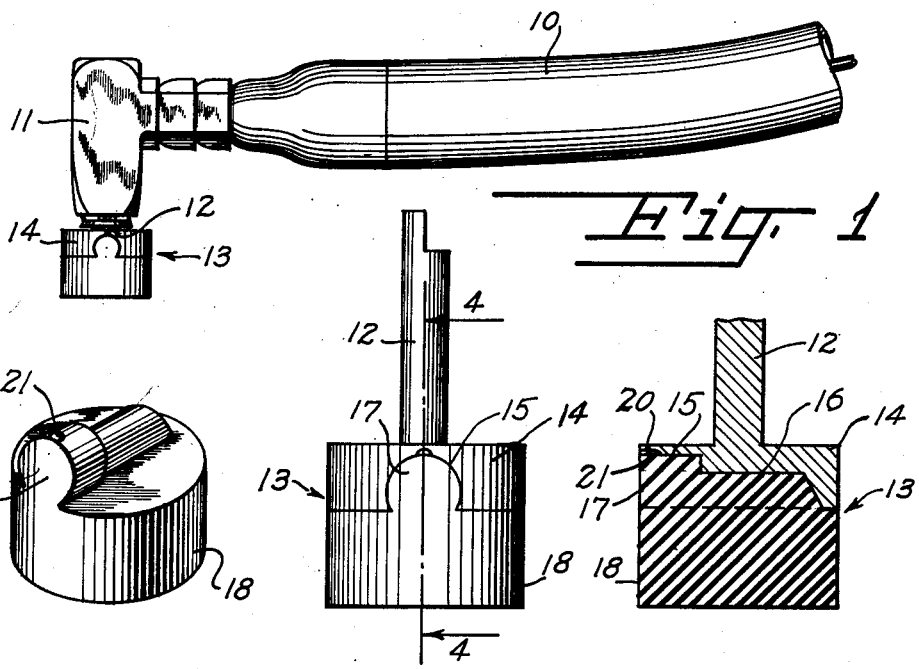
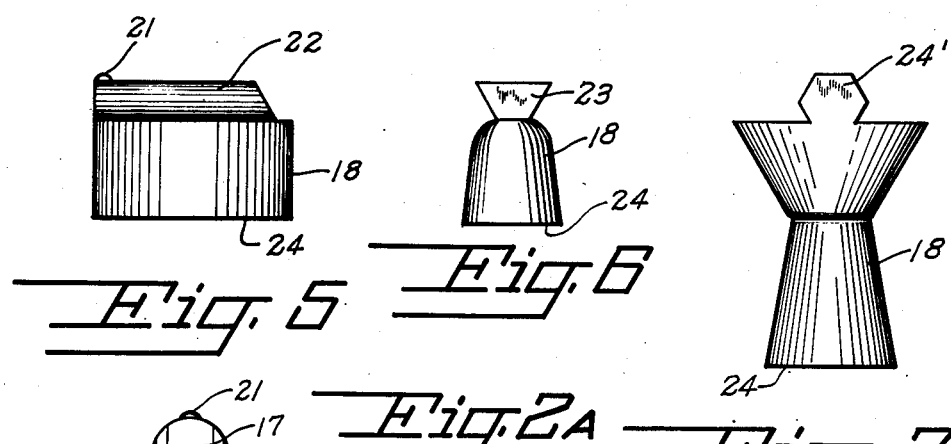
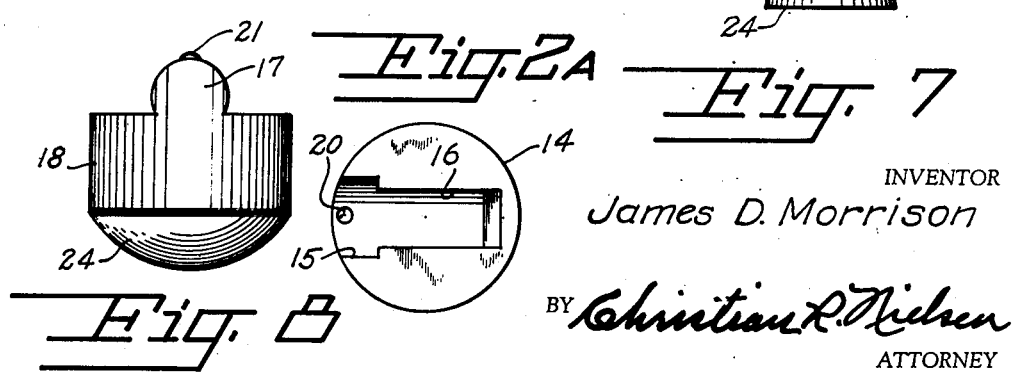
INVENTOR
James D. Morrison
BY Christian R. Nielsen
ATTORNEY Patented June 16, 1953

2,641,836

UNITED STATES PATENT OFFICE 2,641,836

DENTAL PLUGGER

James Douglas Morrison, Medicine Hat, Alberta, Canada

Application August 31, 1951, Serial No. 244,599

2 Claims. (Cl. 32—54)

This invention relates to a means for connecting a rubber working member to a metallic shank and has particular reference to a connection between the shank of a dental plugger and a yieldable working face.

It is the cardinal object of the invention to provide a rubber plugger to remove excess mercury from the surface of amalgam fillings, as well as seating gold inlays and bridges in position by means of a malleting force, and since these operations in some instances will require working faces of various shapes, the working face and shank are so constructed as to be readily attached or detached with a minimum of effort.

It is a further important object of the invention to provide a working head which may be readily attached or detached from the shank of the plugger for sterilizing purposes and otherwise.

This invention is best understood from a consideration of the following detailed description in connection with the accompanying drawing forming a part of this application, nevertheless, it must be borne in mind that the invention is not confined to the disclosure, but is susceptible of such changes and modifications as shall define no material departure from the salient features as expressed in the appended claims.

In the drawing:

Figure 1 is an enlarged side elevation of a conventional plugger, having the working head attached.

Figure 2 is an enlarged perspective view of the working head detached from the shank of the plugger.

Figure 2-A is a bottom plan view of the base of the shank.

Figure 3 is a side elevation of a shank and working head in assembled relation.

Figure 4 is a vertical section on the line 4—4 of Figure 3.

Figure 5 is an enlarged side elevation of the working head.

Figure 6 is a modified form of the working head.

Figure 7 is a further modification of the working head, and

Figure 8 is a still further form of the working head.

For the purpose of illustration, all views of the drawing are greatly enlarged and referring to Figure 1, there is shown a conventional plugger 10 having a chuck head 11 for reciprocably mounting a shank 12 of a working head 13.

The shank 12 has an integral base 14 of circular form as may be seen in Figure 2-A. Transversely and medially of the base 14 a circular groove 15 is formed and concentric therewith a groove 16 of lesser diameter is formed, terminating inwardly of the adjacent periphery of the base, while the groove 15 opens upon the periphery of the base forming a passage for a semi-circular retainer member 17 of a working head 18. The head also has an elongated semi-circular member 19 which is complemental to the groove 16. The working head 18 will be of circular form of the same diameter as the base 14.

In the bottom of the groove 16, inwardly of the periphery of the base, there is a recess 20 which seats a nodule 21 formed on the upper face of the member 17.

Obviously a single straight groove could be formed in the base 14 and in such event, a plain semi-circular retaining member 22, as shown in Figure 5 would be employed.

In Figure 6 a modified form of a retaining member 23 is shown in the shape of a truncated cone, and of course, the groove of the base would have a corresponding shape. In Figure 7 a substantially hexagon shaped retaining member 24 is shown, which likewise would require a similarly shaped groove.

The working head 18 may have any desired work engaging face 24 and in Figure 8, the face is shown as being convex.

In the several forms shown, it will be seen that the working head 18 may be readily secured to the base 14 by merely aligning the retainer members with the groove or grooves of the base and exerting an inward pressure so as to align the working head upon the base in concentric relation thereto. Also, the working head may be readily removed from the base for replacement purposes, thus avoiding the need for replacing the entire instrument, and also heads of various shapes and contours may be interchanged to meet varying requirements.

The working head 18 has been formed of rubber, although resilient material such as polythene or synthetic rubber neoprene may be employed.

I claim:

1. A dental plugger comprising a base having a shank, said base having an inner transverse medial groove, a groove of greater diameter formed in said base and concentric with the first groove, said last named groove opening upon the periphery of the base, and a resilient working face having a retainer member of diameters corresponding to respective grooves.

2. A dental plugger comprising a base having a shank, said base having an inner transverse medial groove, a groove of greater diameter formed in said base and concentric with the first groove, said last named groove opening upon the periphery of the base, a resilient working face having a retainer member of diameters corresponding to respective grooves, a recess formed in the base wall of the last named groove and said retainer member having a nodule complemental to said recess.

JAMES DOUGLAS MORRISON.

References Cited in the file of this patent

UNITED STATES PATENTS

| Number | Name | Date |
| --- | --- | --- |
| 532,721 | Dennis | Jan. 15, 1895 |